United States Patent
Nam

(10) Patent No.: US 11,463,001 B2
(45) Date of Patent: Oct. 4, 2022

(54) DC-DC CONVERTER AND DISPLAY DEVICE INCLUDING THE SAME

(71) Applicant: SAMSUNG DISPLAY CO., LTD., Yongin-si (KR)

(72) Inventor: Yang Uk Nam, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/332,073

(22) Filed: May 27, 2021

(65) Prior Publication Data
US 2022/0149730 A1     May 12, 2022

(30) Foreign Application Priority Data

Nov. 10, 2020    (KR) .................. 10-2020-0149653

(51) Int. Cl.
    *G09G 3/20*           (2006.01)
    *H02M 3/158*         (2006.01)
    *H02M 3/157*         (2006.01)
    *H02M 1/00*          (2006.01)

(52) U.S. Cl.
CPC .............. *H02M 3/157* (2013.01); *G09G 3/20* (2013.01); *H02M 1/0009* (2021.05); *H02M 3/1584* (2013.01); *G09G 2330/023* (2013.01)

(58) Field of Classification Search
CPC ............... G09G 3/20; G09G 2330/028; G09G 2330/021; H02M 3/158
See application file for complete search history.

(56) References Cited

U.S. PATENT DOCUMENTS

| | | |
|---|---|---|
| 8,593,448 B2 | 11/2013 | Park |
| 9,099,033 B2 | 8/2015 | Son et al. |
| 9,535,440 B2 | 1/2017 | Seo et al. |
| (Continued) | | |

FOREIGN PATENT DOCUMENTS

| | | |
|---|---|---|
| EP | 1520336 | 4/2002 |
| EP | 3065277 | 9/2016 |
| (Continued) | | |

OTHER PUBLICATIONS

Extended European Search Report dated Mar. 29, 2022 in corresponding European Patent Application No. 21203060.5 (10 pages).

*Primary Examiner* — Kevin M Nguyen
(74) *Attorney, Agent, or Firm* — F. Chau & Associates, LLC

(57) ABSTRACT

A DC-DC converter may include: a first converter for converting an input voltage to generate a first power supply voltage; a duty ratio controller configured generate a duty ratio control signal for controlling a duty ratio of a switching pulse of the first converter; a switching frequency controller configured to generate a switching frequency control signal for controlling a driving frequency of the first converter corresponding to a switching frequency of the switching pulse; and a current sensor configured to sense current flowing through the first converter. The first converter is driven at a switching frequency of a first frequency in a first mode, based on the switching frequency control signal, and generates the first power supply voltage of a first level, based on the duty ratio control signal. The switching frequency controller determines whether to turn off the current sensor.

20 Claims, 15 Drawing Sheets

(56) References Cited

U.S. PATENT DOCUMENTS

| | | |
|---|---|---|
| 10,679,540 B2 | 6/2020 | Park et al. |
| 2005/0237001 A1* | 10/2005 | Hayafuji ............... G09G 3/3233 |
| | | 315/169.2 |
| 2011/0058285 A1 | 3/2011 | Wibben |
| 2015/0061624 A1 | 3/2015 | Lalithambika et al. |
| 2017/0346402 A1* | 11/2017 | Ishino ................. H02M 3/1588 |
| 2019/0393783 A1 | 12/2019 | Luo |
| 2020/0036288 A1 | 1/2020 | Pyun et al. |
| 2020/0195144 A1 | 6/2020 | Gekinozu |
| 2020/0235656 A1 | 7/2020 | Forouzesh et al. |

FOREIGN PATENT DOCUMENTS

| | | |
|---|---|---|
| KR | 10-2011-0004663 | 1/2011 |
| KR | 10-2015-0049060 | 5/2015 |
| KR | 10-2019-0066104 | 6/2019 |
| KR | 10-2020-0013193 | 2/2020 |
| KR | 10-2096092 | 4/2020 |
| KR | 10-2148498 | 8/2020 |

* cited by examiner

FIG. 8

<Table1>

| T_VSS | Switching Frequency (SF) |
|---|---|
| −0.1V | 217kHz |
| −0.2V | 425kHz |
| −0.3V | 625kHz |
| −0.4V | 816kHz |
| −0.5V | 1MHz |
| −0.6V | 1.176MHz |
| −0.7V | 1.346MHz |
| −0.8V | 1.45MHz |
| −0.9V | 1.45MHz |
| ⋮ | ⋮ |
| −4.0V | 1.45MHz |

FIG. 13

<Table2>

| T_VSS | Switching Frequency (SF) | Current Sensor Control Signal (CSCS) |
|---|---|---|
| −0.1V | 500kHz | OFF |
| −0.2V | 500kHz | OFF |
| −0.3V | 625kHz | ON |
| −0.4V | 816kHz | ON |
| −0.5V | 1MHz | ON |
| −0.6V | 1.176MHz | ON |
| −0.7V | 1.346MHz | ON |
| −0.8V | 1.45MHz | ON |
| −0.9V | 1.45MHz | ON |
| ⋮ | ⋮ | ⋮ |
| −4.0V | 1.45MHz | ON |

※ Reference Frequency (RF) : 500kHz

DC-DC CONVERTER AND DISPLAY DEVICE INCLUDING THE SAME

CROSS-REFERENCE TO RELATED APPLICATION

This application claims priority to and the benefit of Korean Patent Application No. 10-2020-0149653 filed in the Korean Intellectual Property Office on Nov. 10, 2020, the entire contents of which are incorporated herein by reference.

FIELD

This disclosure relates to a DC-DC converter and a display device including the same.

DISCUSSION OF RELATED ART

A display device may include a DC-DC converter that converts an input voltage to a high potential voltage and a concurrent low potential voltage, which are used for driving pixels. For example, the DC-DC converter supplies a positive polarity voltage and a negative polarity voltage to the pixels through power lines.

When the display device is driven to output low luminance, in which the magnitude of driving current is small, the display device may reduce power consumption by changing the voltage level of the high potential voltage and/or the low potential voltage to reduce the difference therebetween. However, due to a minimum on-time designated for driving transistors of a switched mode DC-DC converter, the change in the high potential voltage and/or the low potential voltage generated by the DC-DC converter may be limited. Accordingly, the power saving capability may be likewise limited.

SUMMARY

Embodiments of the inventive concept provide a DC-DC converter and a display device including the same, which may be capable of stably changing a voltage level of a first power supply voltage and securing a minimum on-time.

A DC-DC converter according to various embodiments may include: a first converter for converting an input voltage to generate a first power supply voltage; a duty ratio controller configured generate a duty ratio control signal for controlling a duty ratio of a switching pulse of the first converter; a switching frequency controller configured to generate a switching frequency control signal for controlling a driving frequency of the first converter corresponding to a switching frequency of the switching pulse; and a current sensor configured to sense and limit current flowing through the first converter. The first converter is driven at a switching frequency of a first frequency in a first mode, based on the switching frequency control signal, and generates the first power supply voltage of a first level, based on the duty ratio control signal. The first converter is driven at a switching frequency of a second frequency different from the first frequency in a second mode, based on the switching frequency control signal, and generates the first power supply voltage of a second level different from the first level, based on the duty ratio control signal. The switching frequency controller determines whether to turn off the current sensor.

In an embodiment, the second frequency may be lower than the first frequency, and the first level may be lower than the second level.

In an embodiment, the duty ratio controller may increase the voltage level by decreasing the duty ratio.

In an embodiment, the switching frequency controller may calculate a target duty ratio based on a voltage level of the input voltage and a target voltage level corresponding to the second level, may calculate a correction switching frequency corresponding to the second frequency based on the target on-duty ratio, and may generate the switching frequency control signal based on the correction switching frequency.

In an embodiment, the switching frequency controller may include: a duty ratio calculator for calculating the target duty ratio based on the voltage level of the input voltage and the target voltage level; a switching frequency calculator for calculating the correction switching frequency based on the target duty ratio and a minimum on-time of the first converter; and a switching frequency control signal generator for generating the switching frequency control signal based on the correction switching frequency.

In an embodiment, the switching frequency calculator may calculate the correction switching frequency so that a switching on-time corresponding to the product of a switching period corresponding to the correction switching frequency and the target duty ratio is equal to the minimum on-time.

In an embodiment, when the correction switching frequency is lower than a reference frequency, the switching frequency controller may generate the switching frequency control signal for driving the first converter at a switching frequency of the reference frequency.

In an embodiment, the switching frequency controller may turn off the current sensor.

In an embodiment, the first converter may include: a first inductor connected between a first node and a ground for generating a first inductor current; a first transistor connected between the first node and a first input terminal to which the input voltage is input; a second transistor connected between the first node and a first output terminal through which is output; and a first switching controller for controlling on-off of the first transistor and the second transistor.

In an embodiment, the first switching controller may switching on-time of each of the first transistor and the second transistor based on the duty ratio control signal.

In an embodiment, the first switching controller may control the number of times each of the first transistor and the second transistor is turned on for the same time, based on the switching frequency control signal.

In an embodiment, the current sensor may sense the first inductor current.

In an embodiment, the DC-DC converter may further include a second converter for converting the input voltage to generate a second power supply voltage. The second converter may include: a second inductor connected between a second input terminal to which the input voltage is input and a second node for generating a second inductor current; a third transistor connected between the second node and a ground; a fourth transistor connected between the second node and a second output terminal through which the second power supply voltage is output; and a second switching controller for controlling the third transistor and the fourth transistor.

A display device according to various embodiments may include: a display panel including a plurality of pixels for displaying an image in one of a first mode and a second mode; a data driver for providing a data signal to the display panel; and a DC-DC converter for supplying a power supply voltage to the display panel. The DC-DC converter may include: a converter for converting an input voltage to generate the power supply voltage; a duty ratio controller for changing a duty ratio of a switching pulse of the converter to generate a duty ratio control signal for controlling a voltage level of the power supply voltage; a switching frequency controller for generating a switching frequency control signal for controlling a driving frequency of the converter corresponding to a switching frequency of the switching pulse; and a current sensor for sensing a current flowing through the converter. The converter may be driven at a switching frequency of a first frequency in the first mode, based on the switching frequency control signal, and may generate the power supply voltage of a first level, based on the duty ratio control signal. The converter may be driven at a switching frequency of a second frequency different from the first frequency in a second mode, based on the switching frequency control signal, and may generate the power supply voltage of a second level different from the first level, based on the duty ratio control signal. The switching frequency controller may determine whether to turn off the current sensor.

In an embodiment, the data driver may generate a power control signal and provide the power control signal to the switching frequency controller, and the switching frequency controller may calculate a target voltage level corresponding to the second level based on the power control signal, may calculate a target duty ratio based on a voltage level of the input voltage and the target voltage level, may calculate a correction switching frequency corresponding to the second frequency based on the target duty ratio, and may generate the switching frequency control signal based on the correction switching frequency.

In an embodiment, when the correction switching frequency is lower than a reference frequency, the switching frequency controller may generate the switching frequency control signal for driving the converter at a switching frequency of the reference frequency.

In an embodiment, the switching frequency controller may turn off the current sensor.

In an embodiment, the converter may generate an inductor current, and the current sensor may sense the inductor current.

In an embodiment, the display device may further include a power supply for providing the input voltage and a frequency change control signal to the DC-DC converter.

In an embodiment, the switching frequency controller may generate the switching frequency control signal for driving the converter at the switching frequency of the first frequency in the second mode, based on the frequency change control signal.

BRIEF DESCRIPTION OF THE DRAWINGS

FIGS. 7 and 8 are diagrams for describing an example of the operation of the switching frequency controller of FIG. 6.

FIG. 13 is a diagram for describing an example of the operation of the switching frequency controller of FIG. 12.

DETAILED DESCRIPTION OF EMBODIMENTS

Figure 1:
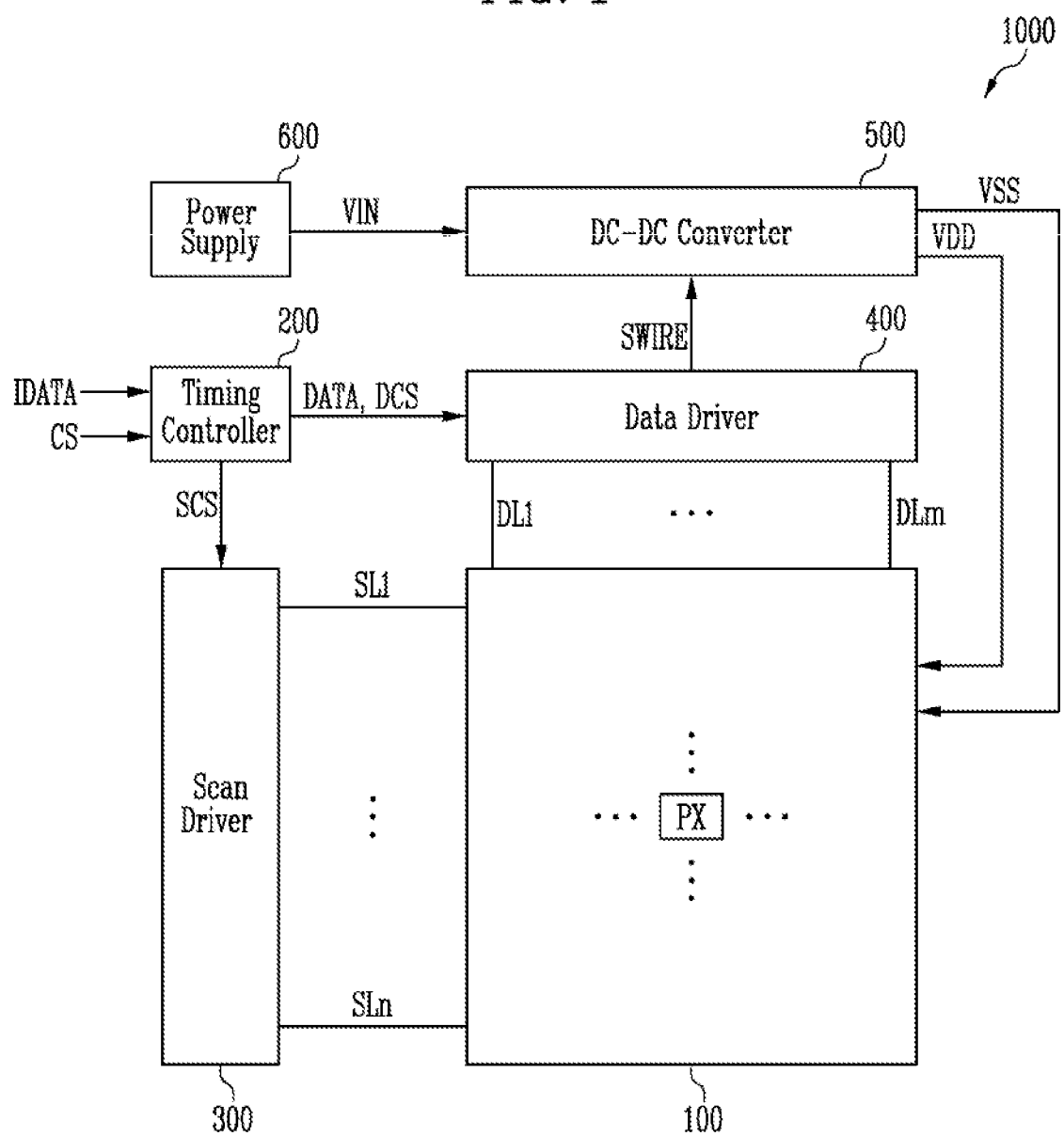
FIG. 1 is a block diagram illustrating a display device according to embodiments of the inventive concept.

Certain embodiments of the inventive concept will be illustrated in the drawings and described in detail in the written description. However, this is not intended to limit the inventive concept to a specific form disclosed herein, and it should be understood that the inventive concept includes all changes, equivalents, and substitutes falling within the spirit and scope of the inventive concept.

In describing each drawing, similar reference numerals are used for similar elements. While terms as "first" and "second" may be used to describe various elements, such elements are not limited by the above terms, since such terms are used to distinguish one element from another. The singular forms "a," "an," and "the" as used herein are intended to include the plural forms as well unless the context clearly indicates otherwise.

The terms "comprises," "comprising," "including," and "having," as used in this application are inclusive and therefore specify the presence of stated features, integers, steps, operations, elements, or components, but do not preclude the presence or addition of one or more other features, integers, steps, operations, elements, components, or combinations thereof.

It will be understood that when a region is referred to as being "connected to" or "coupled to" another region, it may be directly connected or coupled to the other region or intervening regions may be present.

Herein, when an element or signal is first introduced with a name followed by a legend, for brevity, the element/signal may be subsequently referred to using just the legend. For example, "the first power supply voltage VSS" may subsequently be referred to as just "VSS"; "the second power supply voltage VDD" may later be called just "VDD"; the power control signal SWIRE may be later called just "SWIRE", etc.

Herein, terms such as "change VSS", "adjust VSS" or the like mean "change a voltage level of VSS".

FIG. 1 is a block diagram illustrating a display device, 1000, according to embodiments of the inventive concept. The display device 1000 may include a display panel 100, a timing controller 200, a scan driver 300, a data driver 400, a DC-DC converter 500, and a power supply 600.

The display panel 100 may include pixels PX. Each of the pixels PX may be connected to a data line and a scan line corresponding thereto. In addition, each of the pixels PX may receive a first power supply voltage VSS and a second power supply voltage VDD from the DC-DC converter 500. The first power supply voltage VSS and the second power supply voltage VDD may be voltages used for the operations of the pixels PX, and the voltage level of VSS may be lower than the voltage level of VDD. For example, VSS may be a negative voltage, and VDD.

The timing controller 200 may receive input image data IDATA and a control signal CS from the outside. The control signal CS may include a synchronization signal, a clock signal, and the like.

The timing controller 200 may generate a first control signal SCS ("scan control signal") and a second control signal DCS ("data control signal") based on the control signal CS. The timing controller 200 may supply the first control signal SCS to the scan driver 300 and may supply the second control signal DCS to the data driver 400.

The first control signal SCS may include a scan start signal, a clock signal, and the like. The scan start signal may be a signal for controlling the timing of the scan signal. The clock signal included in the first control signal SCS may be used to shift the scan start signal.

The second control signal DCS may include a source start signal, a clock signal, and the like. The source start signal may control a data sampling start timing. The clock signal included in the second control signal DCS may be used to control a sampling operation.

In addition, the timing controller 200 may rearrange the input image data IDATA to generate image data DATA, and provide the image data DATA to the data driver 400.

The scan driver 300 may receive the first control signal SCS from the timing controller 200, and may supply scan signals to scan lines SL1 to SLn (where n is a natural number) based on the first control signal SCS. For example, the scan driver 300 may sequentially supply the scan signals to the scan lines SL1 to SLn. When the scan signals are sequentially supplied, the pixels PX may be selected in units of horizontal lines (or in units of pixel rows), and data signals may be supplied to the selected pixels PX. To this end, the scan signal may be set to a gate-on voltage so that a transistor included in each of the pixels PX and receiving the scan signal is turned on. The gate-on voltage is higher than a gate-off voltage in some embodiments, and is lower than the gate-off voltage in other embodiments.

The data driver 400 may receive the image data DATA and the second control signal DCS from the timing controller 200, and may supply data signals (or data voltages) corresponding to the image data DATA to data lines DL1 to DLm (where m is a natural number) in response to the second control signal DCS. The data signals supplied to the data lines DL1 to DLm may be supplied to the pixels PX selected by the scan signals. To this end, the data driver 400 may supply the data signals to the data lines DL1 to DLm at a timing synchronized with the scan signals.

In an embodiment, the data driver 400 may generate a power control signal SWIRE and provide SWIRE to the DC-DC converter 500. FIG. 1 illustrates that the data driver 400 provides SWIRE to the DC-DC converter 500, but in other examples, SWIRE is provided from the timing controller 200 to the DC-DC converter 500, or from a separate controller to the DC-DC converter 500.

The timing controller 200 and the data driver 400 may be integrated in one driver IC, or may be directly disposed on the display panel 100. In addition, the scan driver 300 may be directly disposed on the display panel 100, or may be connected to the display panel 100 in an IC form.

The DC-DC converter 500 may receive an input voltage VIN from the power supply 600. The DC-DC converter 500 may generate VSS and VDD based on the input voltage VIN. The DC-DC converter 500 may be a switched mode DC-DC converter including an inductor and a pair of transistors that are switched on and off in a complementary manner according to a switching pulse. The DC-DC converter 500 may generate VSS and VDD in such a manner that an inductor current is generated by alternately turning on a plurality of transistors according to a switching frequency of a switching pulse.

On the other hand, the display device 1000 may be driven in a normal mode ("first mode") for displaying an image normally or a power saving mode ("second mode") for displaying an image with low power. The power saving mode is a driving method for reducing/minimizing power consumption by limiting the maximum luminance of the display panel 100 to a preset luminance or less. For example, the power saving mode may be an Always On Display (AOD) mode in which simple display information is always displayed, and/or a predetermined display mode in which a screen is displayed with ultra-low luminance to present a relatively dark screen in a dark environment.

In the power saving mode, the display device 1000 may reduce/minimize power consumption by using the DC-DC converter 500 to change the voltage level of VSS and/or VDD supplied to the display panel 100.

Hereinafter, for brevity of explanation, a description will be given based on a case in which the DC-DC converter 500 changes the voltage level of VSS in the power saving mode.

The display device 1000 may decrease a voltage difference between VSS and VDD by increasing the voltage level of VSS when VSS is negative (hereafter, "a negative VSS"). Power consumption may thereby be reduced/minimized. The reduction in power consumption may be at least partly due to less power consumed by transistors within pixels PX drawing pixel current through paths between VDD and VSS circuit nodes. When the difference between VDD and VSS is reduced, this pixel current is either maintained or does not increase relatively as much as the reduction in (VDD-VSS), whereby power consumption (the product of current and the voltage difference between the circuit nodes) is reduced. For example, the display device 1000 may generate VSS of a first negative level in the normal mode, and may generate VSS of a second negative level higher than the first level in the power saving mode. In this case, the display device may output a positive VDD at the same level in both modes, whereby the difference (VDD-VSS) is reduced in the power save mode as compared to the normal mode. Alternatively, the difference (VDD-VSS) is reduced in the power save mode in other ways, such as by just lowering VDD or by both lowering VDD and raising VSS.

In an embodiment, the DC-DC converter 500 may change VSS based on the power control signal SWIRE in the power saving mode. For example, the DC-DC converter 500 may change the voltage level of VSS by controlling a duty ratio (equivalently, "duty cycle") of the switching pulse applied to transistors within the DC-DC converter 500. To this end, the DC-DC converter 500 may generate VSS of a target voltage level by controlling the duty ratio. For example, the DC-DC converter 500 may increase the voltage level of a negative VSS by reducing the duty ratio in response to SWIRE (equivalently, since the VSS target voltage level is negative, the DC-DC converter 500 may reduce the magnitude of the absolute value of VSS). Power consumption may thereby be reduced/minimized in the power saving mode.

Note, however, that a "minimum on-time" may be designated to allow the DC-DC converter 500 to stably generate VSS and VDD. For example, the minimum on-time may be designated to secure a time for preventing overcurrent from flowing through the DC-DC converter 500 by sensing and limiting the inductor current of the DC-DC converter 500 and secure a dead time between the switching operations applied to the DC-DC converter transistors. The dead time may prevent the transistors from being simultaneously turned on. Therefore, the "on-pulse" time corresponding to the duty ratio may be set to be equal to or greater than the minimum on-time designated for the DC-DC converter 500. The time corresponding to the duty ratio may be understood as an on-pulse time during a switching pulse cycle having a switching period. The minimum on-time may hereinafter be referred to as "switching on-time" or "on-pulse" time, and may correspond to a value obtained by multiplying the switching period of the switching pulse by the duty ratio.

Due to such a minimum on-time, in conventional devices, the voltage level of VSS that is changed by the DC-DC converter 500 may be restricted. As described above, the switching on-time may need to be set equal to or greater than the minimum on-time. Thus, when the switching frequency is the same, the variable range of the on/off duty ratio of the DC-DC converter 500 is limited. Consequently, the DC-DC converter 500 cannot increase a negative VSS above a certain level in conventional devices. That is, the DC-DC converter 500 cannot reduce the on-duty ratio beyond a certain range according to the minimum on-time.

However, the DC-DC converter 500 according to the embodiments of the inventive concept may change the switching frequency so as to increase VSS above a certain level (so as to generate VSS of the target voltage level). For example, when the DC-DC converter 500 reduces the switching frequency, the switching period increases in response to the reduced switching frequency. Thus, the switching on-time may increase for the same duty ratio. Therefore, the DC-DC converter 500 may generate VSS of the target voltage level by further reducing the duty ratio. These operations will be explained further below.

In an embodiment, the DC-DC converter 500 may determine the target voltage level of VSS based on the power control signal SWIRE. The DC-DC converter 500 may calculate a target duty ratio based on the voltage level of the input voltage VIN and the target voltage level of VSS, and may calculate an optimum switching frequency (a "correction switching frequency", or a "second frequency") for the minimum on-time according to the target duty ratio. Therefore, the DC-DC converter 500 may stably generate VSS of the target voltage level by changing the switching frequency from a currently driven switching frequency (the "first frequency") to the correction switching frequency (the "second frequency").

However, when the second frequency calculated based on the input voltage VIN and the target voltage level of VSS is lower than a reference frequency (e.g., less than 500 kHz), the switching operation period of the DC-DC converter 500 is lengthened, causing output ripples.

Therefore, when the second frequency is lower than the reference frequency, the DC-DC converter 500 according to the embodiments of the inventive concept may set the switching frequency corresponding to the reference frequency. As will be explained further below in connection with FIGS. 11-13, at this time, the minimum on-time may be reduced by turning off the operation of a current sensor used for inductor current sensing and limiting. In this case, even when the DC-DC converter 500 is driven at the reference frequency higher than the calculated second frequency, the DC-DC converter 500 may generate VSS at the target voltage level. The reference frequency may refer to the lowest switching frequency at which output ripples do not occur, and may be a value preset by experimentation or the like.

The power supply 600 may be a battery that provides a DC voltage (the input voltage VIN) to the DC-DC converter 500. In other examples, the power supply 600 is a rectifying device that converts an AC voltage into the DC voltage VIN and provides VIN to the DC-DC converter 500.

Figure 2:
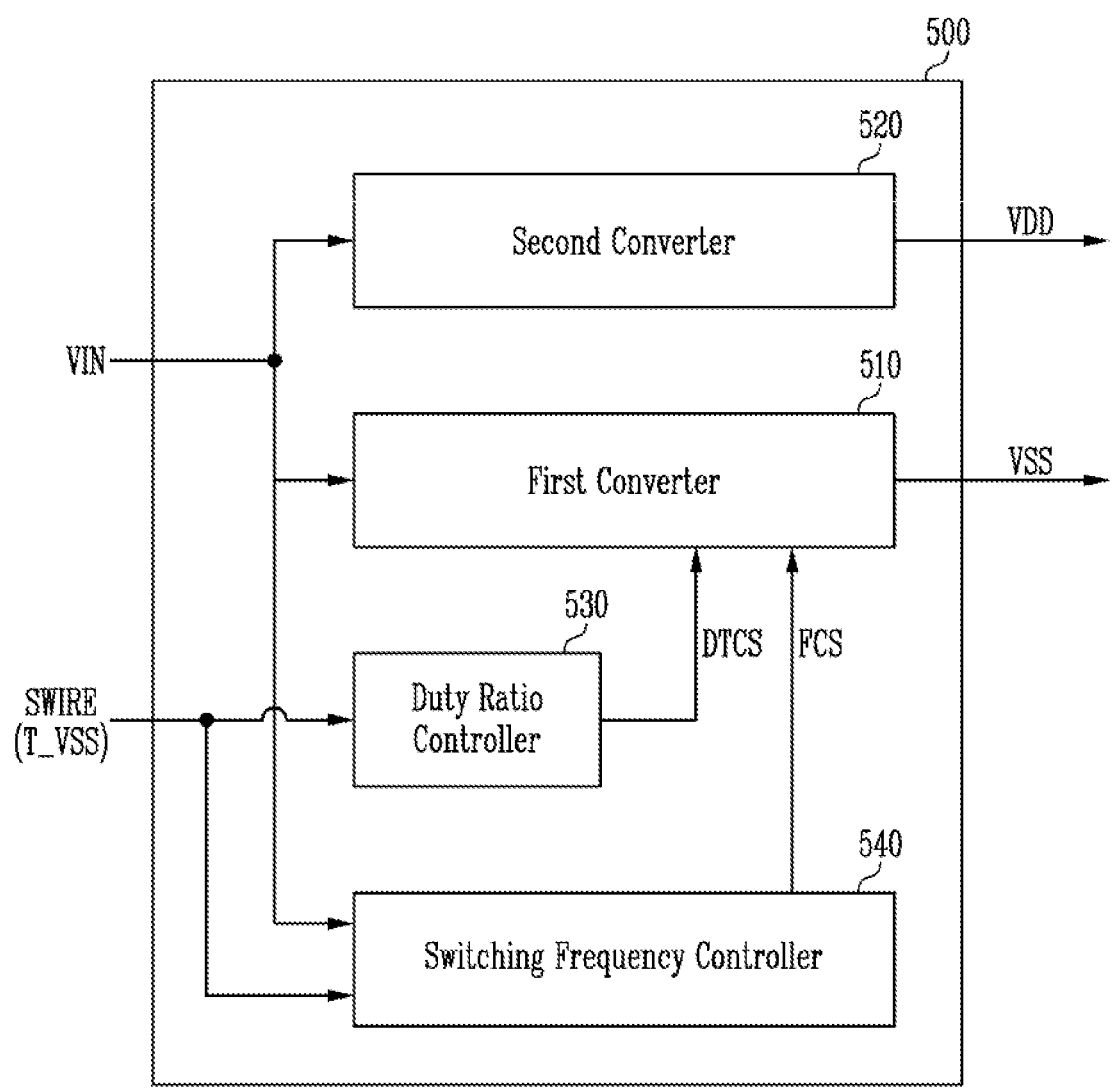
FIG. 2 is a block diagram illustrating a DC-DC converter according to embodiments of the inventive concept.

FIG. 2 is a block diagram illustrating the DC-DC converter according to embodiments of the inventive concept. The DC-DC converter 500 may include a first converter 510, a second converter 520, a duty ratio controller 530, and a switching frequency controller 540.

The first converter 510 may convert an input voltage VIN and output a VSS. In an embodiment, the first converter 510 may be implemented as an inverting buck boost converter.

The second converter 520 may convert the input voltage VIN to output VDD. In an embodiment, the second converter 520 may be implemented as a boost converter.

The duty ratio controller 530 may determine a target voltage level T_VSS of VSS based on the power control signal SWIRE provided from the data driver (400 of FIG. 1). In addition, the duty ratio controller 530 may generate a duty ratio control signal DTCS corresponding to the target voltage level T_VSS of VSS and provide the duty ratio control signal DTCS to the first converter 510.

In an embodiment, the first converter 510 may change the duty ratio of the switching pulse to the target duty ratio based on the duty ratio control signal DTCS provided from the duty ratio controller 530. For example, the first converter 510 may increase the voltage level of a negative VSS by reducing the on-duty ratio of the switching pulse to the target duty ratio based on the duty ratio control signal DTCS (in other words, the first converter 510 may reduce the magnitude of the absolute value of VSS).

The switching frequency controller 540 may determine T_VSS based on SWIRE. In addition, the switching frequency controller 540 may calculate the target duty ratio of the switching pulse based on the voltage level of the input voltage VIN and T_VSS, and may calculate the second frequency for the minimum on-time according to the target duty ratio. The switching frequency controller 540 may generate a switching frequency control signal FCS according to the second frequency and provide FCS to the first converter 510.

In an embodiment, the first converter 510 may be driven by changing the switching frequency of the switching pulse to the correction switching frequency based on the switching frequency control signal FCS provided from the switching frequency controller 540.

The operation of changing the duty ratio and the switching frequency of the switching pulse, which is performed by the first converter 510, will be described in detail with reference to FIGS. 6 to 8.

Figure 3:
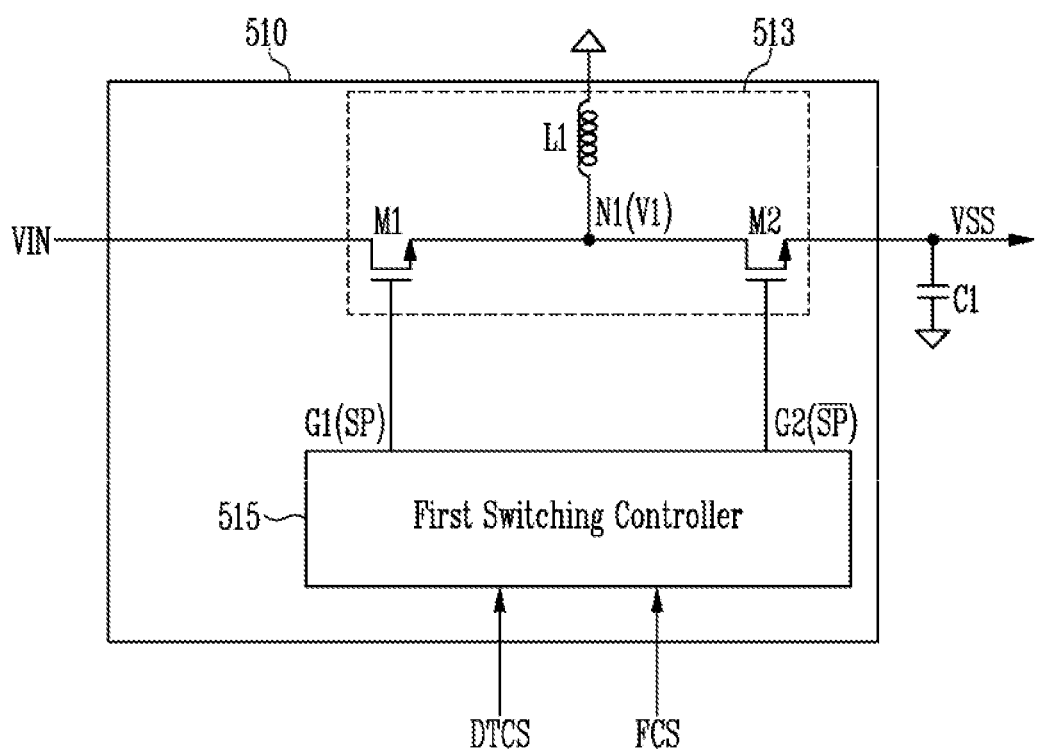
FIG. 3 is a diagram illustrating an example of a first converter included in the DC-DC converter of FIG. 2.

FIG. 3 is a diagram illustrating an example of the first converter included in the DC-DC converter of FIG. 2. The first converter 510 may include a switch circuit 513 and a first switching controller 515. The switch circuit 513 may include a first inductor L1, a first transistor M1, and a second transistor M2.

The first inductor L1 may be connected between a first node N1 and a ground. VSS may be controlled based on a first inductor current flowing through the first inductor L1.

The first transistor M1 may be connected between the first node N1 and a first input terminal to which the input voltage VIN is applied. The first transistor M1 may be turned on by a first control signal G1 received from the first switching controller 515, and may control a current to flow through the first inductor L1.

The second transistor M2 may be connected between the first node N1 and a first output terminal to which VSS is output. The second transistor M2 may be turned on alternately with the first transistor M1 in response to a second control signal G2 supplied from the first switching controller 515. Therefore, after the first transistor M1 is turned on and electromotive force is generated in the first inductor L1, the second transistor M2 is turned on so that the input voltage VIN is changed to VSS and VSS is output to the first output terminal. In this case, the first node N1 may be defined as a common node of the first transistor M1, the second transistor M2, and the first inductor L1.

The first switching controller 515 may control on-off of the first transistor M1 and the second transistor M2. The first and second transistors M1 and M2 may be alternately turned on and off under the control of the first switching controller 515.

A first capacitor C1 may be connected between the ground and the first output terminal through which VSS is output.

On the other hand, as described above with reference to FIG. 2, the first switching controller 515 may change the duty ratio of the switching pulse based on the duty ratio control signal DTCS, and may change the switching frequency of the switching pulse based on the switching frequency control signal FCS.

Figure 4:
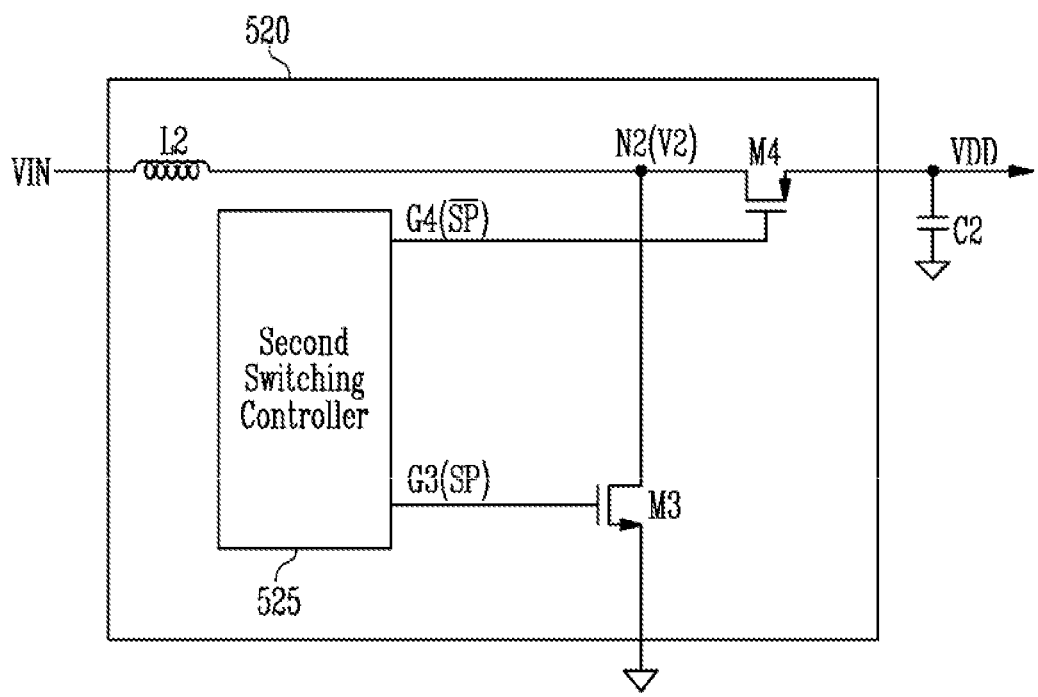
FIG. 4 is a diagram illustrating an example of a second converter included in the DC-DC converter of FIG. 2.

FIG. 4 is a diagram illustrating an example of the second converter included in the DC-DC converter of FIG. 2. The second converter 520 may include a switch and a second switching controller 525. The switch of the second converter 520 may include a second inductor L2, a third transistor M3, and a fourth transistor M4.

The second inductor L2 may be connected between a second node N2 and a second input terminal to which the input voltage VIN is applied. VDD may be controlled based on a second inductor current flowing through the second inductor L2.

The third transistor M3 may be connected between the second node N1 and a ground. The third transistor M3 may be turned on by a third control signal G3 received from the second switching controller 525, and may control a current to flow through the second inductor L2.

The fourth transistor M4 may be connected between the second node N2 and a second output terminal to which VDD is output. The fourth transistor M4 may be turned on alternately with the third transistor M3 in response to a fourth control signal G4 supplied from the second switching controller 525. Therefore, after the third transistor M3 is turned on and electromotive force is generated in the second inductor L2, the fourth transistor M4 is turned on so that a voltage V2 of the second node N2 is changed to VDD.

The second switching controller 525 may control on-off of the third transistor M3 and the fourth transistor M4. The third and fourth transistors M3 and M4 may be alternately turned on and off under the control of the second switching controller 525.

A second capacitor C2 may be connected between the ground and the second output terminal through which VDD is output.

Figure 5:
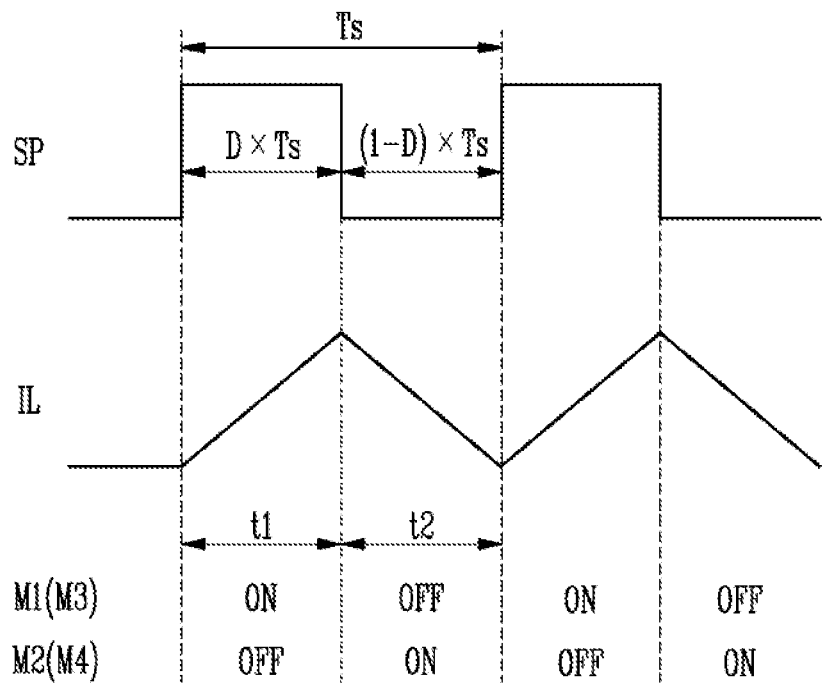
FIG. 5 is a diagram illustrating an example of the operations of the first converter of FIG. 3 and the second converter of FIG. 4.

Hereinafter, specific operations of the first converter 510 and the second converter 520 will be described with reference to FIG. 5. FIG. 5 illustrates a timing diagram of a switching pulse SP for on/off control of the transistors M1, M2, M3, and M4 and an inductor current IL flowing through the inductors L1 and L2.

Referring to FIGS. 3 to 5, the first converter 510 may alternately turn on and turn off the first transistor M1 and the second transistor M2 according to on/off switching of the switching pulse SP. For example, if the control signal G1 is synchronized with SP (e.g., G1 is high when SP is high, G1 is low when SP is low), the control signal G2 may be synchronized with the inverse of SP, "SP bar" (when SP is high, G2 is low, when SP is low, G2 is high). The switching pulse SP may have a predetermined switching frequency and a switching period Ts corresponding thereto. The switching pulse SP may be switched on/off according to the switching frequency. A ratio of a time t1 corresponding to a duration in which the switching pulse SP is on-level (or high level) to the switching period Ts corresponds to a duty ratio D. Therefore, the duty ratio D may have a value between 0 and 1.

During the time t1 corresponding to the duration in which the switching pulse SP is on-level (or high level) in the switching period Ts, the first transistor M1 may be turned on in response to the first control signal G1 and the second transistor M2 may be turned off in response to the second control signal G2. When the first transistor M1 is turned on and the second transistor M2 is turned off (t1), the voltage V1 of the first node N1 may have a voltage level of the approximately the input voltage VIN. (More precisely, the voltage at the node N1 may be $V_{IN}$ minus the drain-to-source voltage drop across transistor M1). Under this condition, the magnitude of the inductor current IL flowing through the first inductor L1 may increase due to a difference between the voltage V1 at the first node N1 and the ground voltage level of the ground.

Also, at a time t2 corresponding to a duration in which the switching pulse SP is off-level (or low level) in the switching period Ts, the first transistor M1 may be turned off in response to the first control signal G1 and the second transistor M2 may be turned on in response to the second control signal G2. When the first transistor M1 is turned off and the second transistor M2 is turned on (t2), the voltage V1 of the first node N1 drops down and have the ground voltage level of the ground, and the magnitude of the inductor current IL flowing through the first inductor L1 may decrease due to a difference between the ground and the voltage V1 of the first node N1.

By repeating the switching period Ts, the first converter 510 may output VSS through the first output terminal. On the other hand, the second converter 520 may output VDD through the switching operation that is substantially the same as that of the first converter 510.

The first converter 510 may change the voltage level of VSS by controlling the duty ratio D based on the duty ratio control signal DTCS. For example, when the first converter 510 decreases the duty ratio D based on the duty ratio control signal DTCS, the switching on-time (illustrated as DxTs in FIG. 5) may be reduced corresponding to the same switching period Ts. Therefore, the voltage level of VSS may decrease.

However, as described above with reference to FIG. 1, since the switching on-time DxTs is set to at least the minimum on-time, the first converter 510 cannot increase a negative VSS above a certain level based on the same switching frequency (or switching period Ts).

For example, a relationship between the input voltage VIN and the output voltage VSS (in this example) according to the duty ratio D is expressed as Equation 1 below.

$$VSS = -\left(\frac{D}{1-D} \times VIN\right) \quad \text{[Equation 1]}$$

In addition, since the switching on-time DxTs is to be set to at least the minimum on-time, the first converter 510 may decrease the duty ratio D until the switching on-time DxTs and the minimum on-time are equal. For example, when the switching frequency is set to about 1.45 MHz and the minimum on-time is set to about 100 ns, the first converter 510 may decrease the duty ratio (D) to 0.145. In this case, when the input voltage VIN is about 4.5 V, the maximum value of VSS that can be generated by the first converter 510 is about −0.763 V.

However, as described above with reference to FIG. 1, the display device 1000 may reduce power consumption by increasing the voltage level of a negative VSS in the power saving mode. To this end, VSS (i.e., VSS of the target voltage level T_VSS) greater than the maximum value of VSS in the above-described example may be required.

Therefore, the first converter 510 may generate VSS of the target voltage level T_VSS by changing the switching frequency (or switching period Ts) according to the target voltage level T_VSS of VSS. The switching frequency changing operation of the first converter 510 will be described in detail with reference to FIGS. 6 to 8.

Figure 6:
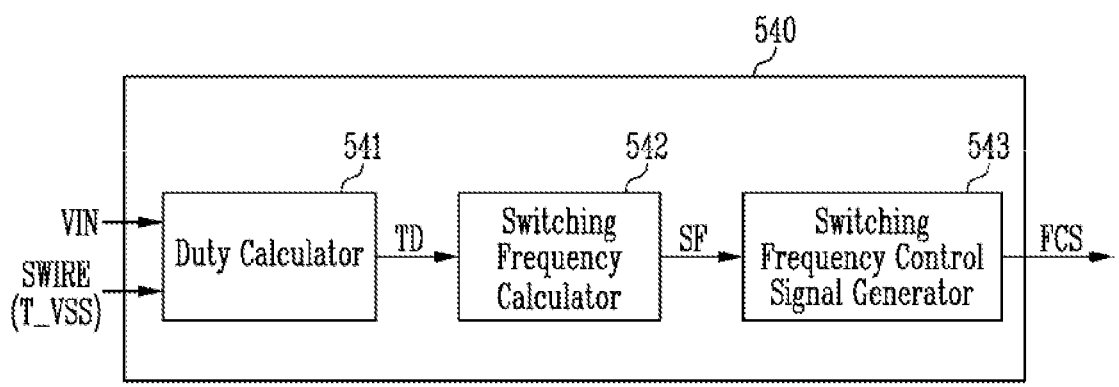
FIG. 6 is a diagram illustrating an example of a switching frequency controller included in the DC-DC converter of FIG. 2.
Figure 7:
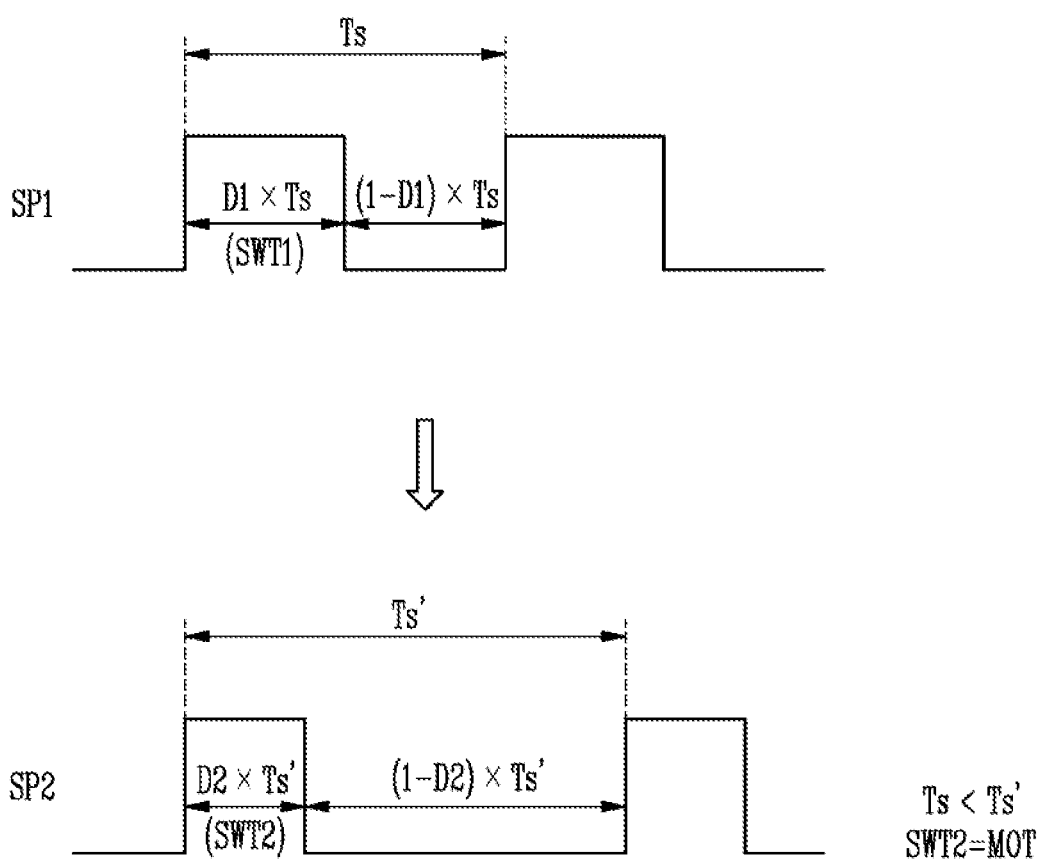

FIG. 6 is a diagram illustrating an example of the switching frequency controller included in the DC-DC converter of FIG. 2, and FIGS. 7 and 8 are diagrams illustrating an example of the operation of the switching frequency controller of FIG. 6.

Referring to FIGS. 2 and 6, the switching frequency controller 540 may include a duty ratio calculator 541, a switching frequency calculator 542, and a switching frequency control signal generator 543.

The duty calculator 541 may receive the input voltage VIN and the power control signal SWIRE. The duty ratio calculator 541 may determine the target voltage level T_VSS of VSS based on SWIRE.

In an embodiment, the duty ratio calculator 541 may calculate a target duty ratio TD based on VIN and T_VSS. For example, the duty ratio calculator 541 may calculate the target duty ratio TD by using Equation 1 above.

The switching frequency calculator 542 may calculate the correction switching frequency SF for the minimum on-time based on the target duty ratio TD corresponding to T_VSS. For example, the switching frequency calculator 542 may use Equation 2 below to calculate the correction switching frequency SF so that the switching on-time corresponding to the product of the switching period (Ts in FIG. 5) corresponding to the switching frequency SF and the target duty ratio TD is equal to the minimum on-time.

$$Ts = \frac{Min}{TD} \quad \text{[Equation 2]}$$

In Eqn. 2, Ts represents the switching period corresponding to the correction switching frequency SF, Min represents the minimum on-time, and TD represents the target duty ratio.

The switching frequency control signal generator 543 may generate the switching frequency control signal FCS for changing the switching frequency of the first converter 510, based on the correction switching frequency SF calculated by the switching frequency calculator 542.

FIG. 7 shows a switching pulse SP1 having a switching period Ts corresponding to a driving switching frequency (or first frequency) of the first converter 510 when the display device (1000 in FIG. 1) is driven in the normal mode, and a switching pulse SP2 having a switching period Ts' corresponding to a correction switching frequency SF (or second frequency) when the display device (1000 in FIG. 1) is driven in the power saving mode.

The first converter 510 may generate VSS by performing the switching operation at the first frequency according to the switching period Ts of the switching pulse SP1 in the normal mode. The voltage level of VSS may be determined according to the duty ratio D1 (or switching on-time SWT1) of the switching pulse SP1. On the other hand, the switching frequency (first frequency) in the normal mode may be preset according to the design of the display device (1000 in FIG. 1), and for example, the first frequency may be set to about 1.45 MHz.

In the power saving mode, the first converter 510 may calculate the target duty ratio TD (or on-duty ratio D2) based on the target voltage level T_VSS of VSS, and may calculate the correction switching frequency SF (or second frequency). The switching period Ts' corresponding to the correction switching frequency SF may be greater than the switching period Ts corresponding to the first frequency (Ts<Ts'). Therefore, even when the target voltage level T_VSS of a negative VSS is large, that is, even when the duty ratio D2 is small, a switching on-time SWT2 may be sufficiently secured. For example, the switching on-time SWT2 may be equal to the minimum on-time MOT. Therefore, the first converter 510 may operate stably.

Referring further to FIG. 8, FIG. 8 illustrates the correction switching frequency SF corresponding to the target voltage level T_VSS of VSS. As illustrated in FIG. 8, as the target voltage level T_VSS of VSS increases (or the absolute value decreases), the calculated correction switching frequency SF may decrease. For example, as the target voltage level T_VSS of VSS increases from about −0.8 V to about −0.1 V, the calculated correction switching frequency SF may decrease from about 1.45 MHz to about 217 kHz.

On the other hand, the first converter 510 may be driven at the first frequency up to the target voltage level T_VSS that may be changed according to the first frequency. For example, when the target voltage level T_VSS of VSS is from about −4.0 V to about −0.8 V, the first converter 510 may be driven at about 1.45 MHz (first frequency).

Figure 9:
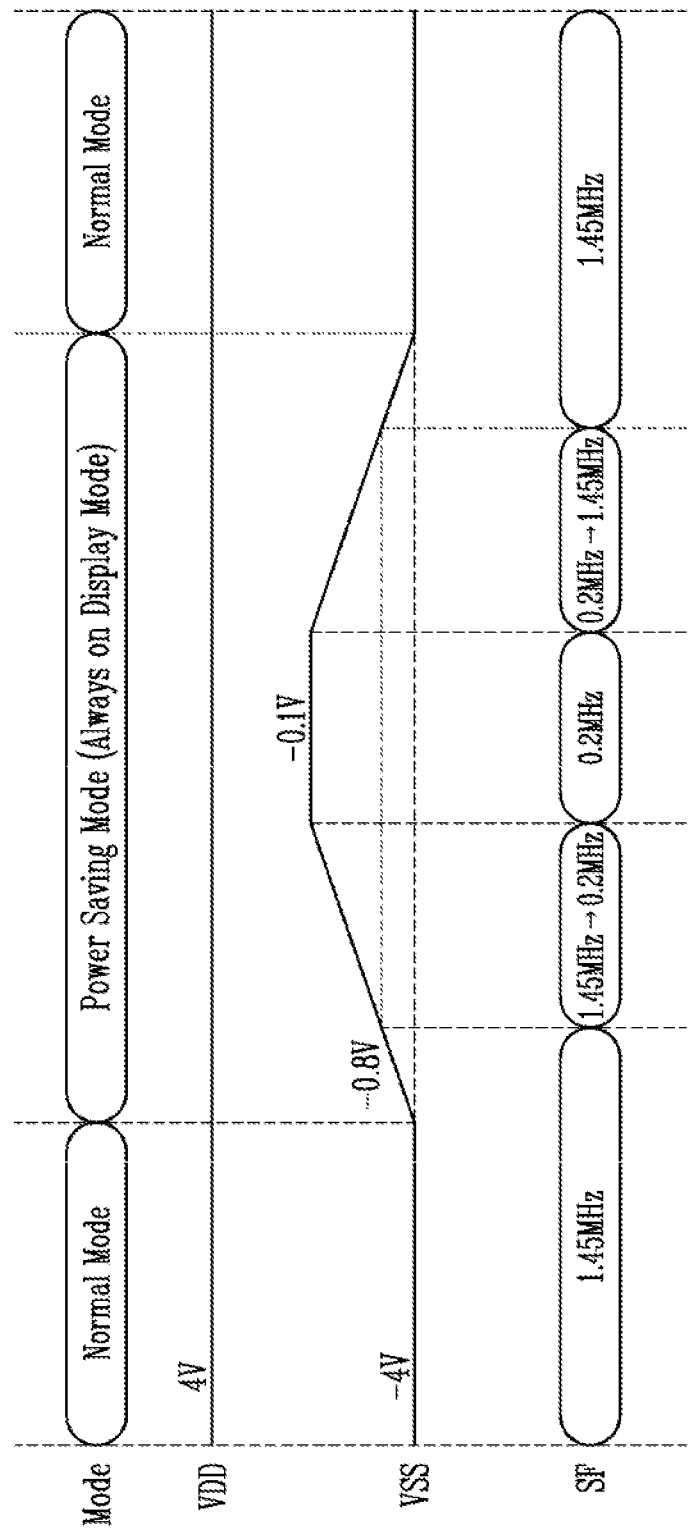
FIG. 9 is a waveform diagram illustrating an example of the operation of the DC-DC converter of FIG. 2.

FIG. 9 is a waveform diagram illustrating an example of the operation of the DC-DC converter of FIG. 2. FIG. 9 illustrates the voltage levels of VSS and VDD according to the driving mode of the display device (1000 in FIG. 1) and the correction switching SF according to the target voltage level of VSS.

Referring to FIGS. 1, 2, 6, and 9, in the normal mode, the display device 1000 may not change the voltage levels of VSS and VDD. For example, the voltage level of VSS may be about −4 V, and the voltage level of VDD may be about 4 V. In the normal mode, the switching frequency (or the first frequency) of the DC-DC converter 500 (or the first converter 510) may be set to about 1.45 MHz.

In the power saving mode, the display device 1000 may change the voltage level of VSS. For example, the display device 1000 may use the DC-DC converter 500 to increase the voltage level of VSS from about −4 V to about −0.1 V.

In an embodiment, the DC-DC converter 500 may increase the voltage level of VSS while the first converter 510 is driven at the first frequency until the target voltage level T_VSS that may be changed according to the first frequency. For example, the first converter 510 may generate VSS ranging from about −4 V to about −0.8 V while performing the switching operation at the switching frequency of about 1.45 MHz.

In an embodiment, the DC-DC converter 500 may calculate the target duty ratio TD based on the input voltage VIN and the target voltage level T_VSS of VSS, may calculate the correction switching frequency SF based on the target duty ratio TD, and may drive the first converter 510 at the correction switching frequency SF to generate VSS of the target voltage level T_VSS. For example, the first converter 510 may generate VSS of about −0.8 V to about −0.1 V while performing the switching operation at the switching frequency (or the correction switching frequency SF) of about 1.45 MHz to about 0.2 MHz.

As described above with reference to FIGS. 1 to 9, the display device 1000 (or the DC-DC converter 500) according to the embodiments of the inventive concept may drive the first converter 510 according to the correction switching frequency SF to secure the minimum on-time MOT and stably generate VSS of the target voltage level T_VSS.

Figure 10:
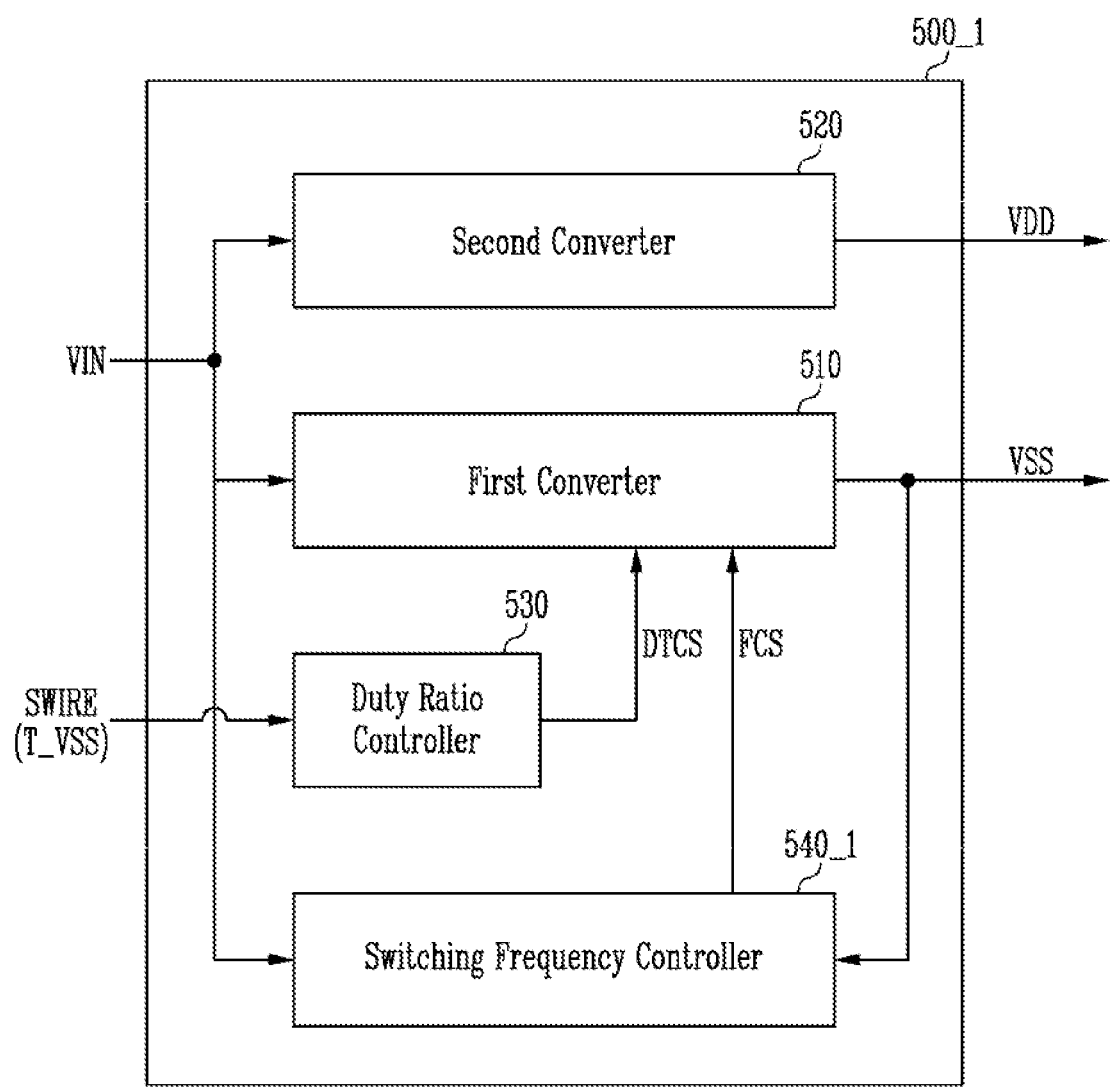
FIG. 10 is a block diagram illustrating a DC-DC converter according to embodiments of the inventive concept.

FIG. 10 is a block diagram illustrating a DC-DC converter according to embodiments of the inventive concept. The DC-DC converter 500_1 of FIG. 10 may be substantially the same as the DC-DC converter 500 of FIG. 2 except for a switching frequency controller 540_1.

Referring to FIG. 10, the switching frequency controller 540_1 may sense a target voltage level T_VSS of a first power supply voltage VSS directly from a first output terminal of a first converter 510, instead of determining the target voltage level T_VSS of VSS based on SWIRE, like the switching frequency controller 540 of FIG. 2.

Figure 11:
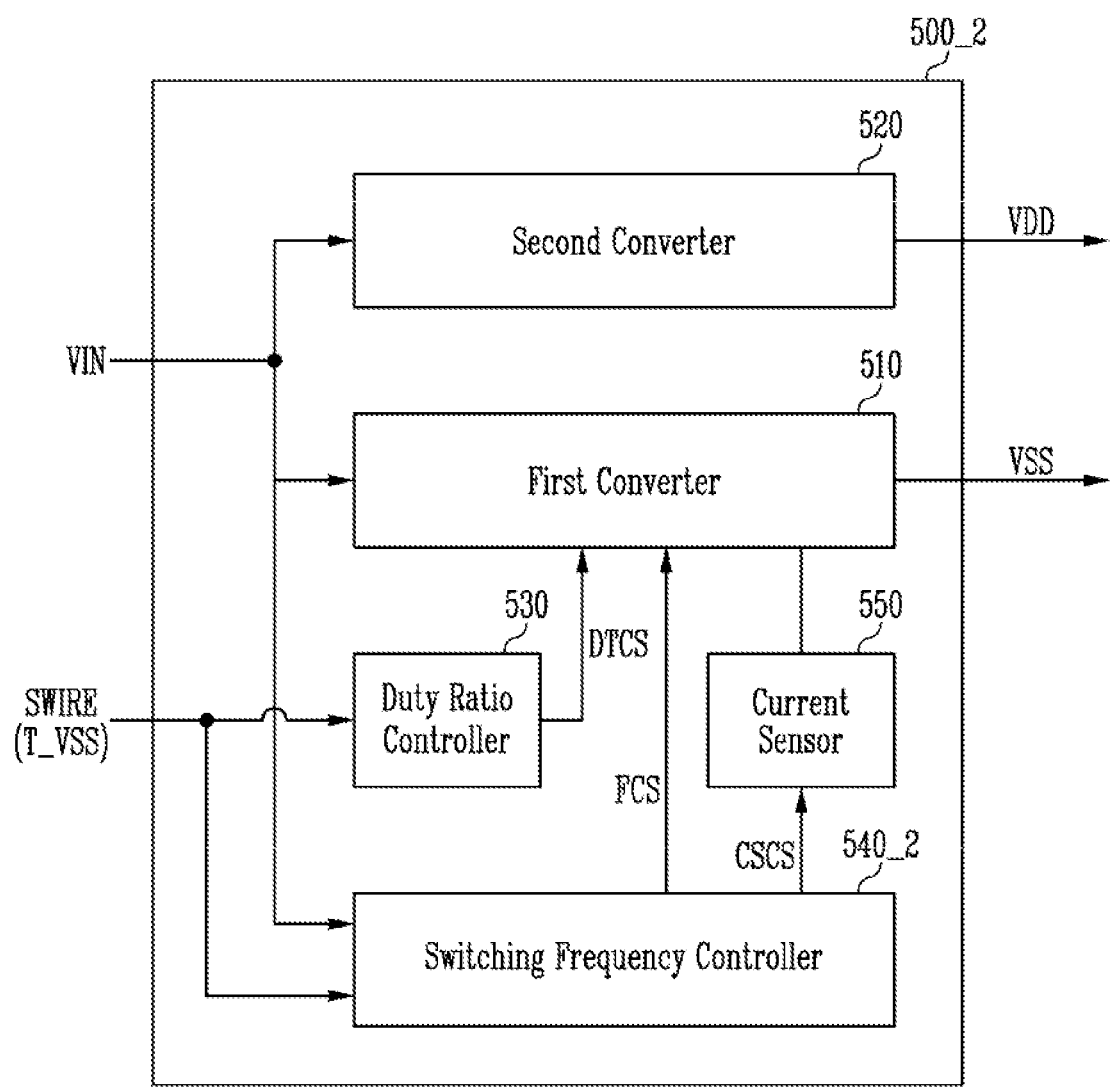
FIG. 11 is a block diagram illustrating a DC-DC converter according to embodiments of the inventive concept.
Figure 12:
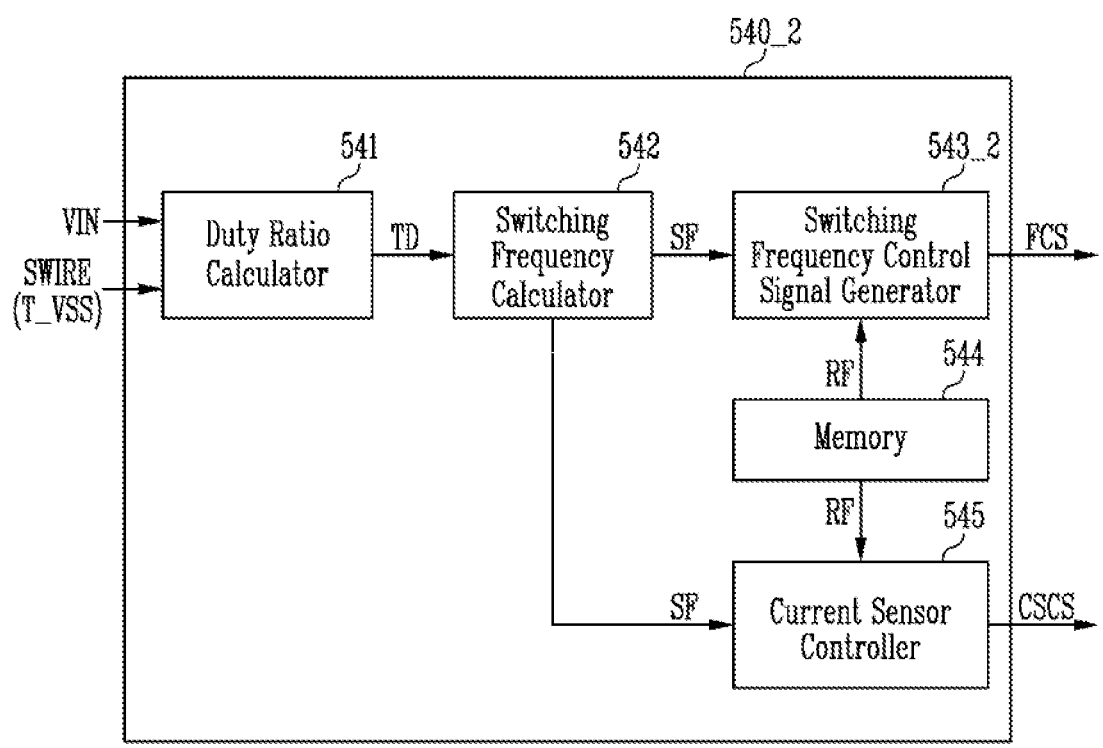
FIG. 12 is a diagram illustrating an example of a switching frequency controller included in the DC-DC converter of FIG. 11.

FIG. 11 is a block diagram illustrating a DC-DC converter according to embodiments of the inventive concept, FIG. 12 is a diagram illustrating an example of a switching frequency controller included in the DC-DC converter of FIG. 11, and FIG. 13 is a diagram for describing an example of the operation of the switching frequency controller of FIG. 12. The DC-DC converter 500_2 of FIG. 11 may be substantially the same as the DC-DC converter 500 of FIG. 2 except for a switching frequency controller 540_2 and a current sensor 550.

Referring to FIG. 11, the current sensor 550 may sense an inductor current of a first converter 510. For example, the current sensor 550 may be implemented as a current mirror circuit or the like, in conjunction with current limiting circuitry, to sense and limit the inductor current of the first converter 510. The current sensor 550 may sense the inductor current of the first converter 510 and may control the first converter 510 to prevent an overcurrent from flowing through an inductor according to temperature, distribution of the inductor, and the like. On the other hand, for brevity of explanation, only the current sensor 550 for sensing the inductor current of the first converter 510 is illustrated in FIG. 11, but the DC-DC converter 500_2 may further include a current sensor for sensing and limiting an inductor current of a second converter 520.

On the other hand, the minimum on-time of the first converter 510 may occupy most of the time for the inductor current sensing and current limiting operations of the current sensor 550. For example, when the minimum on-time is set to 100 ns, the time for the inductor current sensing and current limiting operations of the current sensor 550 may correspond to about half of the minimum on-time.

On the other hand, when the switching frequency of the first converter 510 is low (e.g., a reference frequency), the current sensing and limiting operations of the current sensor 550 may not be useful because overcurrent does not flow through the inductor. In this case, the switching frequency controller 540_2 may reduce the minimum on-time by turning off the operation of the current sensor 550.

Specifically, when the correction switching frequency calculated based on the target voltage level T_VSS of VSS is lower than the reference frequency, the switching frequency controller 540_2 may control the first converter 510 to be switched and driven at the reference frequency and turn off the operation of the current sensor 550.

Referring to FIG. 12, the switching frequency controller 540_2 may further include a duty ratio calculator 541, a switching frequency calculator 542, a switching frequency control signal generator 543_2, a memory 544, and a current sensor controller 545. The duty ratio calculator 541 and the switching frequency calculator 542 may be substantially the same as the duty ratio calculator 541 and the switching frequency calculator 542 described above with reference to FIG. 6, respectively.

The memory 544 may provide a value of the reference frequency RF to the switching frequency control signal generator 543_2 and the current sensor controller 545.

When the correction switching frequency SF provided from the switching frequency calculator 542 is lower than the reference frequency RF, the switching frequency control signal generator 543_2 may generate the switching frequency control signal FCS so that the first converter 510 is switched and driven at the reference frequency RF. As described above with reference to FIG. 1, the reference frequency RF may refer to the lowest switching frequency of the first converter 510 at which output ripples do not occur, and may be a value preset by experiment or the like. Since the switching frequency of the first converter 510 is limited to the reference frequency RF by the switching frequency control signal generator 543_2, the first converter 510 may stably generate VSS, without generating output ripples.

When the correction switching frequency SF provided from the switching frequency calculator 542 is lower than the reference frequency RF, the current sensor controller 545 may generate the current sensor control signal CSCS for turning off the current sensor. In this case, since the current sensor 550 is turned off by the current sensor control signal CSCS, the minimum on-time may be reduced. Therefore, even when the first converter 510 performs the switching operation at the reference frequency RF, the first converter 510 may generate VSS of the target voltage level T_VSS. Specifically, even when the first converter 510 reduces the duty ratio according to VSS of the low target voltage level T_VSS, the minimum on-time is reduced by the turn-off of the current sensor 550, and the switching on-time corresponding to the target voltage level T_VSS is set to be greater than or equal to the minimum on-time. Therefore, the first converter 510 may stably generate VSS.

For example, referring further to FIG. 13, the first converter 510 performs the switching operation at the reference frequency of 500 kHz according to the target voltage level T_VSS of about −0.2 V or more, and turns off the operation of the current sensor 550, thereby stably generating VSS corresponding to the target voltage level T_VSS.

Figure 14:
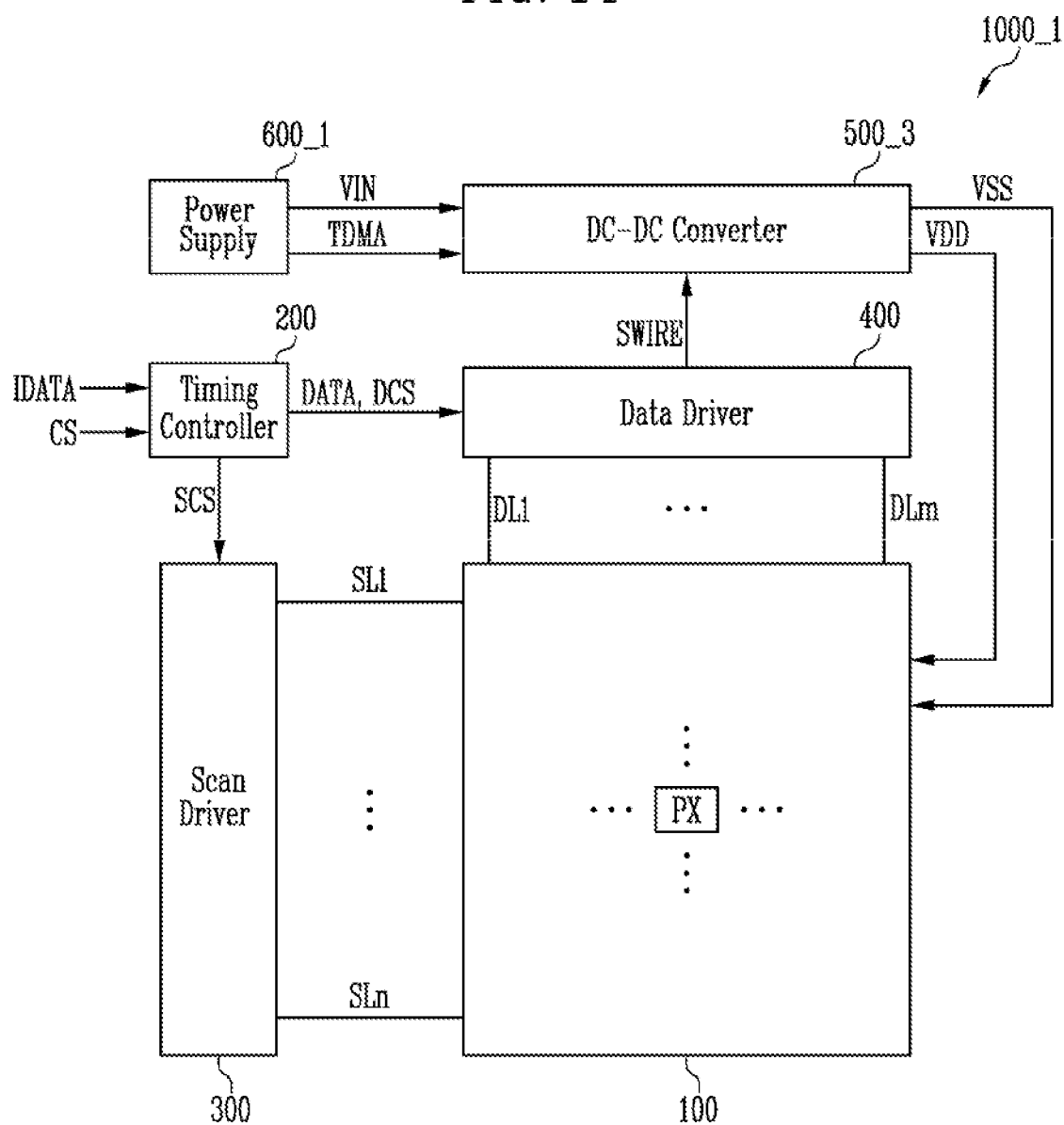
FIG. 14 is a block diagram illustrating a display device according to embodiments of the inventive concept.
Figure 15:
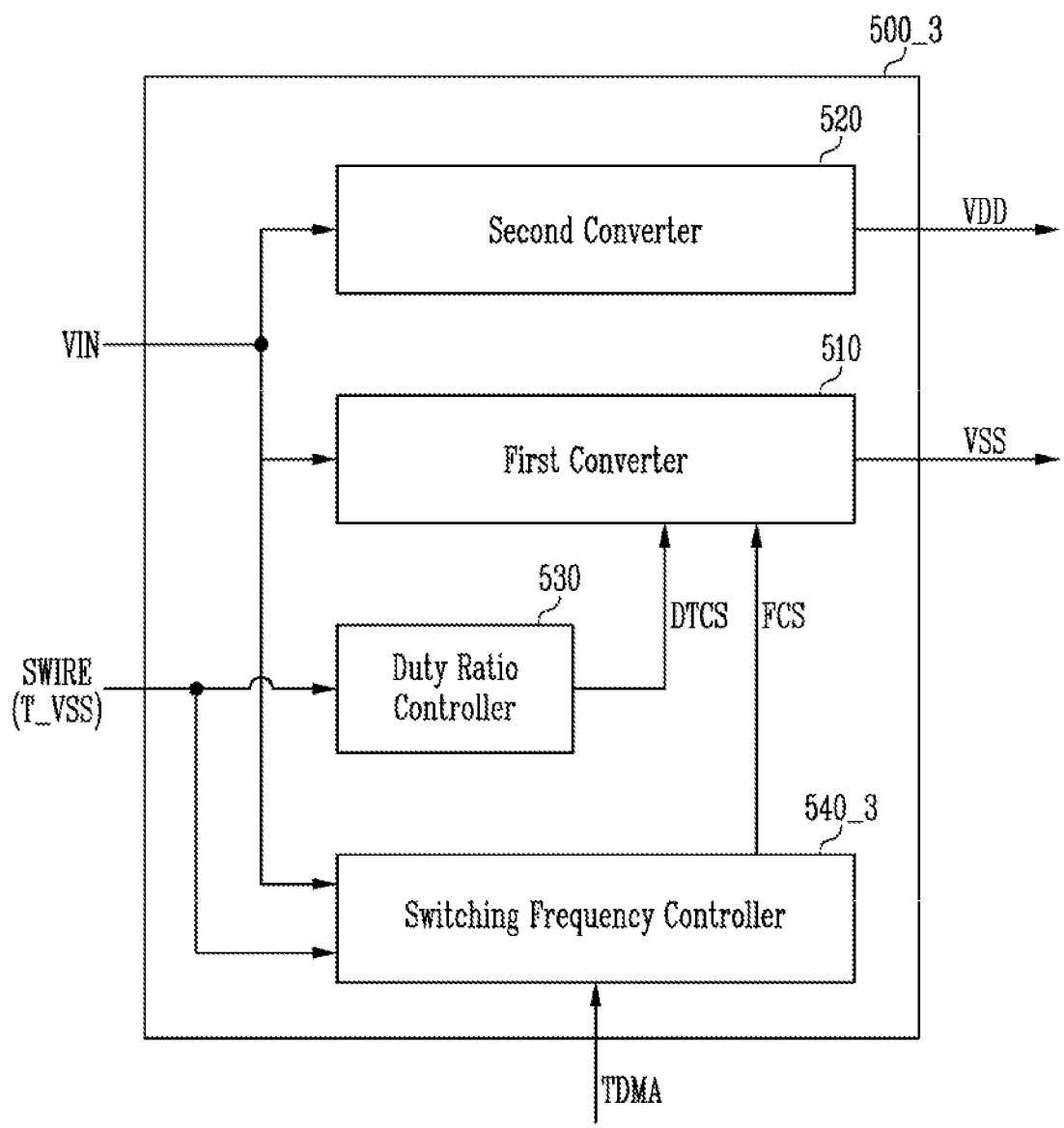
FIG. 15 is a block diagram illustrating a DC-DC converter according to embodiments of the inventive concept.

FIG. 14 is a block diagram illustrating a display device according to example embodiments; FIG. 15 is a block diagram illustrating a DC-DC converter according to embodiments of the inventive concept; and FIG. 16 is a waveform diagram illustrating an example of the operation of the DC-DC converter of FIG. 15.

Figure 16:
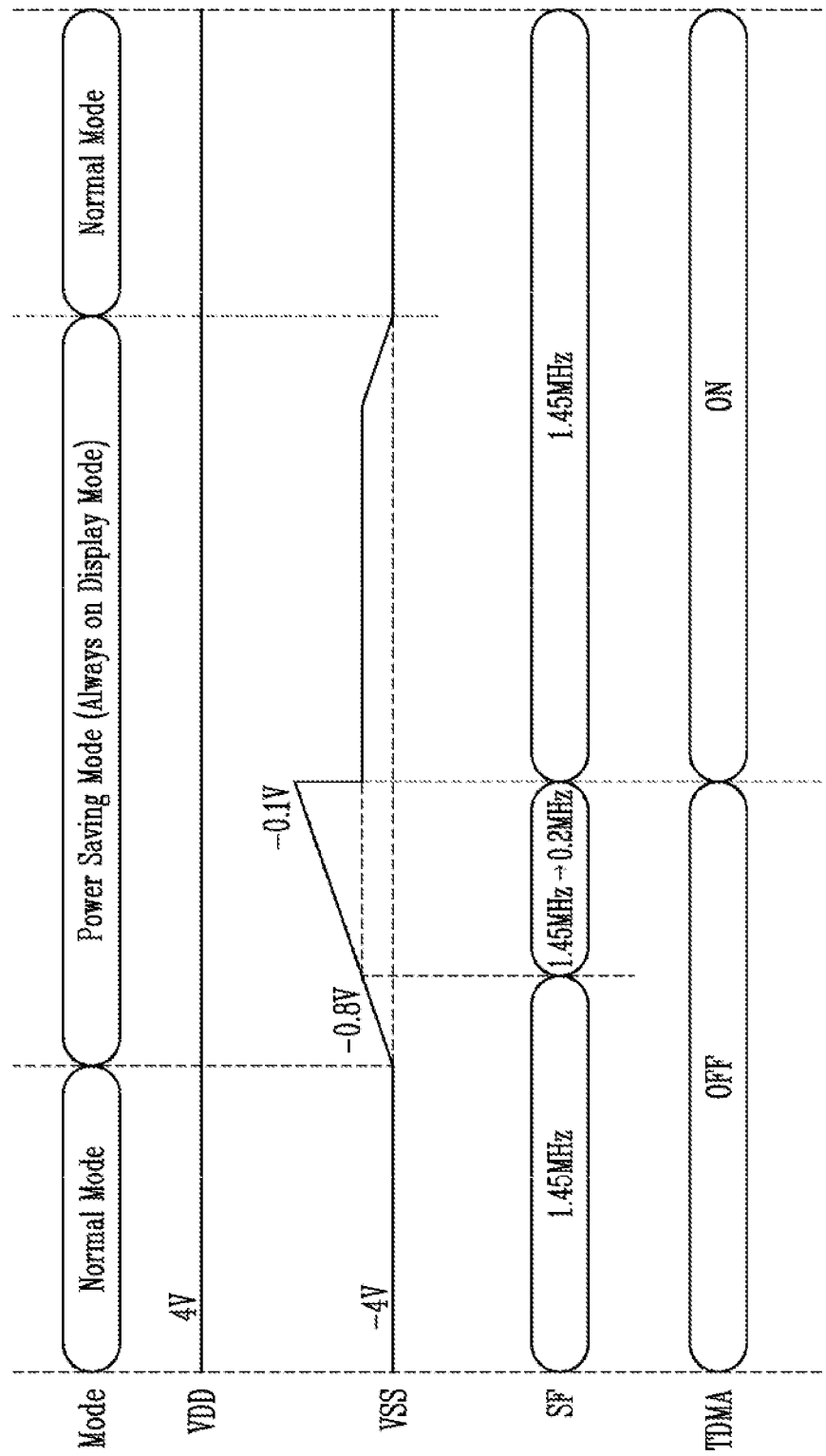
FIG. 16 is a waveform diagram illustrating an example of the operation of the DC-DC converter of FIG. 15.

Referring to FIGS. 14 to 16, a power supply 600_1 of a display device 1000_1 may sense instability (typically due to noise) of an input voltage VIN output to a DC-DC converter 500_3 through an output terminal and generate a frequency change control signal TDMA. The power supply 600_1 may provide the frequency change control signal TDMA to the DC-DC converter 500_3.

A switching frequency controller 540_3 of the DC-DC converter 500_3 may set a switching frequency of a first converter 510 to a first frequency in a power saving mode, based on the frequency change control signal TDMA.

For example, as illustrated in FIG. 16, as a target voltage level T_VSS of a first power supply voltage VSS increases from about −0.8 V to about −0.1 V in the power saving mode, the switching frequency controller 540_3 may decrease the switching frequency of the first converter 510 from about 1.45 MHz (first frequency) to about 0.2 MHz (second frequency). However, in order to prevent output ripples due to the switching frequency changing operation of the first converter 510 when the instability of the input voltage VIN is detected by the power supply 600_1 even in the power saving mode, the switching frequency controller 540_3 may generate the switching frequency control signal FCS so that the first converter 510 is driven at 1.45 MHz (first frequency), based on the frequency change control signal TDMA provided from the power supply 600_1.

Therefore, in the power saving mode, the first converter 510 may generate VSS having the maximum target voltage level T_VSS (e.g., about −0.8 V) corresponding to the first frequency.

The DC-DC converter and the display device having the same according to the embodiments of the inventive concept may perform the switching operation based on a switch frequency optimized for a minimum on-time corresponding to the target voltage level. Accordingly, the DC-DC converter may stably change the voltage level of a power supply voltage and secure the minimum on-time. It is noted, however, that the benefits of the inventive concept are not limited to those described above.

The above detailed description is intended to illustrate and describe representative examples of the inventive concept. While inventive concepts described herein have been particularly shown and described with reference to the example embodiments, various changes in form and details may be made therein without departing from the spirit and scope of the claimed subject matter as defined by the following claims and their equivalents.

What is claimed is:

1. A DC-DC converter comprising:
a first converter configured to convert an input voltage into a first power supply voltage;
a duty ratio controller configured to generate a duty ratio control signal for controlling a duty ratio of a switching pulse of the first converter;
a switching frequency controller configured to generate a switching frequency control signal controlling a driving frequency of the first converter corresponding to a switching frequency of the switching pulse; and
a current sensor configured to sense a current flowing through the first converter,
wherein,
the first converter is driven at the switching frequency of a first frequency in a first mode, based on the switching frequency control signal, and generates the first power supply voltage of a first level, based on the duty ratio control signal,
the first converter is driven at the switching frequency of a second frequency different from the first frequency in a second mode, based on the switching frequency control signal, and generates the first power supply voltage of a second level different from the first level, based on the duty ratio control signal, and
the switching frequency controller determines whether to turn off the current sensor.

2. The DC-DC converter of claim 1, wherein the second frequency is lower than the first frequency, and
the first level is lower than the second level.

3. The DC-DC converter of claim 1, wherein the duty ratio controller increases the voltage level of the first power supply voltage by decreasing the duty ratio.

4. The DC-DC converter of claim 1, wherein the switching frequency controller calculates a target duty ratio based on a voltage level of the input voltage and a target voltage level corresponding to the second level, calculates a correction switching frequency corresponding to the second frequency based on the target duty ratio, and generates the switching frequency control signal based on the correction switching frequency.

5. The DC-DC converter of claim 4, wherein the switching frequency controller comprises:
a duty ratio calculator which calculates the target on-duty ratio based on the input voltage and the target voltage level;
a switching frequency calculator which calculates the correction switching frequency based on the target duty ratio and a minimum on-time of the first converter; and
a switching frequency control signal generator which generates the switching frequency control signal based on the correction switching frequency.

6. The DC-DC converter of claim 5, wherein the switching frequency calculator calculates the correction switching frequency so that a switching on-time corresponding to the product of a switching period for the correction switching frequency and the target duty ratio is substantially equal to the minimum on-time.

7. The DC-DC converter of claim 4, wherein, when the correction switching frequency is lower than a reference frequency, the switching frequency controller generates the switching frequency control signal to drive the first converter at a switching frequency of the reference frequency.

8. The DC-DC converter of claim 7, wherein the switching frequency controller turns off the current sensor.

9. The DC-DC converter of claim 1, wherein the first converter comprises:
a first inductor connected between a first node and a ground to generate a first inductor current;
a first transistor connected between the first node and a first input terminal to which the input voltage is supplied;
a second transistor connected between the first node and a first output terminal through which the first power supply voltage is output; and
a first switching controller which controls the first transistor and the second transistor.

10. The DC-DC converter of claim 9, wherein the first switching controller controls switching on-time of each of the first transistor and the second transistor based on the duty ratio control signal.

11. The DC-DC converter of claim 9, wherein the first switching controller controls the number of times each of the first transistor and the second transistor is turned on for the same time, based on the switching frequency control signal.

12. The DC-DC converter of claim 9, wherein the current sensor senses the first inductor current.

13. The DC-DC converter of claim 1, further comprising:
a second converter which converts the input voltage into a second power supply voltage,
wherein the second converter comprises:
a second inductor connected between a second input terminal to which the input voltage is supplied and a second node to generate a second inductor current;
a third transistor connected between the second node and a ground;
a fourth transistor connected between the second node and a second output terminal through which the second power supply voltage is output; and
a second switching controller which controls the third transistor and the fourth transistor.

14. A display device comprising:
a display panel including a plurality of pixels and displaying an image in one of a first mode and a second mode;
a data driver configured to provide a data signal to the display panel; and
a DC-DC converter which supplies a power supply voltage to the display panel,
wherein the DC-DC converter comprises:
a converter configured to generate an input voltage to generate the power supply voltage;
a duty ratio controller configured to change a duty ratio of a switching pulse of the converter to generate a duty ratio control signal controlling a voltage level of the power supply voltage;
a switching frequency controller configured to generate a switching frequency control signal controlling a driving frequency of the converter corresponding to a switching frequency of the switching pulse; and
a current sensor which senses and limits a current flowing through the converter,
wherein,
the converter is driven at the switching frequency of a first frequency in the first mode, based on the switching frequency control signal, and generates the power supply voltage of a first level, based on the duty ratio control signal,
the converter is driven at the switching frequency of a second frequency different from the first frequency in the second mode, based on the switching frequency control signal, and generates the power supply voltage of a second level different from the first level, based on the duty ratio control signal, and
the switching frequency controller determines whether to turn off the current sensor.

15. The display device of claim 14, wherein the data driver generates a power control signal and provides the power control signal to the switching frequency controller, and
the switching frequency controller calculates a target voltage level corresponding to the second level based on the power control signal, calculates a target duty ratio based on the input voltage and the target voltage level, calculates a correction switching frequency corresponding to the second frequency based on the target duty ratio, and generates the switching frequency control signal based on the correction switching frequency.

16. The display device of claim 15, wherein, when the correction switching frequency is lower than a reference frequency, the switching frequency controller generates the switching frequency control signal to drive the converter at a switching frequency of the reference frequency.

17. The display device of claim 16, wherein the switching frequency controller turns off the current sensor.

18. The display device of claim 14, wherein the converter generates an inductor current, and
the current sensor senses the inductor current.

19. The display device of claim 14, further comprising:
a power supply which provides the input voltage and a frequency change control signal to the DC-DC converter.

20. The display device of claim 19, wherein the switching frequency controller generates the switching frequency control signal for driving the converter at the switching frequency of the first frequency in the second mode, based on the frequency change control signal.

* * * * *